United States Patent
Schmitt et al.

(10) Patent No.: US 11,119,481 B2
(45) Date of Patent: Sep. 14, 2021

(54) METHOD FOR SETTING PARAMETERS IN AN AUTONOMOUS WORKING DEVICE AND AN AUTONOMOUS WORKING DEVICE

(71) Applicant: HONDA RESEARCH INSTITUTE EUROPE GMBH, Offenbach/Main (DE)

(72) Inventors: Sebastian Schmitt, Offenbach (DE); Markus Olhofer, Offenbach (DE); Hideaki Shimamura, Saitama (JP); Yuki Matsui, Saitama (JP)

(73) Assignee: HONDA RESEARCH INSTITUTE EUROPE GMBH, Offenbach/Main (DE)

( * ) Notice: Subject to any disclaimer, the term of this patent is extended or adjusted under 35 U.S.C. 154(b) by 171 days.

(21) Appl. No.: 16/115,755

(22) Filed: Aug. 29, 2018

(65) Prior Publication Data

US 2019/0064817 A1  Feb. 28, 2019

(30) Foreign Application Priority Data

Aug. 29, 2017  (EP) .................................. 17188406

(51) Int. Cl.
*G01D 1/00* (2006.01)
*A01C 21/00* (2006.01)
(Continued)

(52) U.S. Cl.
CPC ......... *G05D 1/0088* (2013.01); *A01C 21/005* (2013.01); *A01D 34/008* (2013.01);
(Continued)

(58) Field of Classification Search
CPC ......... G05D 1/0088; G05D 2201/0208; G05D 2201/0201; G05D 2201/0215;
(Continued)

(56) References Cited

U.S. PATENT DOCUMENTS 6,076,030 A * 6/2000 Rowe .................. E02F 3/435
                                                    172/4.5
9,629,517 B2 4/2017 Sakai et al.
(Continued)

FOREIGN PATENT DOCUMENTS

EP    2 447 014 A2    5/2012

OTHER PUBLICATIONS

European Search Report dated Mar. 2, 2018 corresponding to European Patent Application No. 17188406.7.

*Primary Examiner* — Nga X Nguyen
(74) *Attorney, Agent, or Firm* — Squire Patton Boggs (US) LLP

(57) ABSTRACT

A system and method are provided for setting parameters in an autonomous working device. The autonomous working device can be controlled based on a plurality of parameters. For each of a plurality of different working environments a set of sensor values is generated. The plurality of sets is partitioned into categories, each category corresponding to a prototypical working environment. The parameters for each category are optimized to find an optimized parameter set for each prototypical working environment. For an individual working environment, an individual set of sensor values that the sensors of the autonomous working device produce is generated. Based at least on the individual set of sensor values, the prototypical working environment showing highest similarity to the individual environment is determined, and the parameters in the autonomous working device are set according to the optimized parameter set corresponding to the determined prototypical working environment.

10 Claims, 2 Drawing Sheets

(51) Int. Cl.
*A01D 34/00* (2006.01)
*A01D 41/127* (2006.01)
*A47L 9/28* (2006.01)
*G06N 3/12* (2006.01)
*G05D 1/00* (2006.01)
*G05B 13/02* (2006.01)
*A01D 101/00* (2006.01)

(52) U.S. Cl.
CPC .......... *A01D 41/127* (2013.01); *A47L 9/2852* (2013.01); *G05B 13/024* (2013.01); *G06N 3/126* (2013.01); *A01D 2101/00* (2013.01); *A47L 2201/04* (2013.01); *G05D 2201/0201* (2013.01); *G05D 2201/0208* (2013.01); *G05D 2201/0215* (2013.01)

(58) Field of Classification Search
CPC .... G05D 1/0221; G05B 13/024; G05B 17/02; G06N 3/126; A47L 9/2852; A47L 2201/04; A01D 34/008; A01D 41/127; A01D 2101/00; A01C 21/005
See application file for complete search history.

(56) References Cited

U.S. PATENT DOCUMENTS

| | | | |
|---|---|---|---|
| 9,720,412 B1 | 8/2017 | Zhu et al. | |
| 2016/0243701 A1* | 8/2016 | Gildert | G05B 19/42 |
| 2018/0150779 A1* | 5/2018 | Wei | E02F 3/7609 |

* cited by examiner

METHOD FOR SETTING PARAMETERS IN AN AUTONOMOUS WORKING DEVICE AND AN AUTONOMOUS WORKING DEVICE

BACKGROUND

Field:

The invention regards a method for setting parameters to be used in an autonomous working device for operating the autonomous working device and the autonomous working device itself.

Description of the Related Art:

Autonomous working devices are well suited to improve the comfort of people using such autonomous working device instead of performing tasks themselves that can be delegated to a working device. Popular examples are indoor vacuum cleaners, which autonomously drive around and perform vacuum cleaning simultaneously, but also autonomous agricultural devices such as lawn mowers, harvesters or seeding robots. Usually such autonomous working devices are equipped with a plurality of sensors such as bump sensor for detecting obstacles that are in the path of the working device or electromagnetic sensors that detect existence and proximity of for example a border wire in the case of an autonomous lawn mower. Using such sensors, it is also possible to record a time series of events, for example when an obstacle is hit, when the border wire is approached, which turning maneuver was executed, the electromagnetic field strength or at what time charging events occur. Thus, by means of the sensors, information on the operation in a specific environment can be collected. The behavior of the working device is controlled using a set of internal parameters. Such parameters may be for example the minimal and maximal turning angles for random turns after hitting an obstacle, probabilities to determine which type of turning maneuver will be executed when approaching the border wire and the like. But also parameters like speeds, operation of the working tool and the like are controlled based on such parameters. It depends on the task that is to be performed by the autonomous working machine, which functions or aspects of functions are controlled based on such parameters. Up to now, it is the duty of a developer of such autonomous working device to choose a parameter set, store it in the autonomous working device so that the final product successfully can be operated with the sufficient efficiency, but also avoiding unwanted and dangerous behavior at the customer.

Of course, the working environment, where the autonomous working device is finally operated, may vary to a large extent. Working efficiency may then be improved by adapting the parameters of the autonomous working device such that for the individual environment satisfying operation can be achieved. Of course, this causes problems for the manufacturer of the autonomous working device, because he has no opportunity to know in advance the exact working environment of the sold product. The default values that were set by the manufacturer of course provide safe operation of the device, but on the other side always are a compromise regarding working efficiency. Thus, it could be thought of allowing some of the parameters to be adjusted to the individual working environment after the device was delivered to the customer. But since this adaptation of some parameters does not take into account a potential interaction between different parameters, the results may be unsatisfying. In particular, it could happen that undesired control feedback oscillation loops occur. In particular, if the number of adjustable parameters is rather high, it is almost impossible to avoid parameter combinations causing an unpredictable behavior or a degraded performance. Apart from the danger that might be caused by such an unpredictable behavior, it is furthermore annoying for the customer, if he has to test the performance and then reiterate the adaptation of the parameters set in the autonomous working device.

In order to improve performance and increase the comfort for the user, it was suggested in U.S. Pat. No. 9,629,517 B2 to change specific parameters online by use of look up tables and on the basis of an image analysis. The cleaning device takes pictures while being operated and analyses the surface to be cleaned. Then, based on explicit rules, some parameters like for example brush height, air openings, travel direction and the like are set newly. But here again, it is problematic that the parameter adaptation is performed online and that only some specific parameters are adapted. The resulting parameter combination may be completely useless or even allow risky operation of the device.

SUMMARY

Thus, it is an object of the present invention to allow a simple adaptation of parameters of an autonomous working device to its working environment while at the same time ensuring safe operation under all circumstances.

This problem is solved using the method for setting parameters in an autonomous working device according to the present claims.

According to certain embodiments of the present invention, at first a plurality of parameter sets each one for a different working environment is generated. For such plurality of parameter sets it can be ensured during development of the autonomous working device that the combinations of different parameters allow optimal control of the autonomous working device for each working condition. The parameter sets are optimized with regard to typical working environments. Then, during start-up of the autonomous working device, one of such typical working environments having a high degree of similarity to the individual working environment where the autonomous working device actually shall operate is determined. The corresponding parameter set, which was defined during development of the autonomous working device, is selected and then automatically set in the autonomous working device. The further operation in this individual environment is then performed based on this selected set of parameters.

In order to generate the plurality of sets of parameters during development of the device for each of the different working environments, a set of sensor values is generated. The sensor values are generated either by actually sensing and recording during operation of the autonomous working device in a working environment or by simulating operation of the working device in many environments. Such simulation offers the possibility to generate sensor data for a well defined variety of potential working environments. Thus, any working environment where the autonomous working device finally operates, has at least some similarity to the defined working environments of the simulation.

After the plurality of sets of sensor values have been generated, this plurality of sets of sensor values is partitioned into categories. Each category corresponds to a prototypical working environment. Then, for each of the prototypical working environments an optimized parameter set is generated. The automatization thus results in one set of parameters for each prototypical environment, for which the best working performance in such prototypical working environment can be expected.

In order to select and set the set of optimized parameters in the autonomous working device which fits to the individual working environment best and thus to adapt the behavior and performance of the autonomous working device to the individual working environment where the autonomous working device is intended to operate, an individual set of sensor values is generated for this individual working environment. This individual set of sensor values is preferably generated by operating the device in the individual environment of the customer when start up of the system is performed. In case that the shape of the individual working area for example and other boundaries for the operation of the autonomous working device are known, a simulation might be used again to generate this individual set of sensor values.

Then, based at least on the further set of sensor values, the prototypical working environment which shows the highest similarity to the individual environment is determined. For the operation of the autonomous working device then the optimized parameter set corresponding to the determined prototypical working environment is set in the autonomous working device.

With the inventive method it is possible to predefine sets of working parameters for the autonomous working device and to select from a plurality of these sets one set which fits best to the individual working environment. Since the finally selected parameter set is generated on the basis of sensor values generated for a plurality of potential working environments and then optimizing the parameters for each of a plurality of environments, meaning a category of sensor values, it is possible to avoid a bad interaction or combination of individual parameters already during development of the autonomous working device. Thus, in the end the parameter set, which is associated with one prototypical working environment, is a definition of a complete set of parameters that is used by the autonomous working device for operation including all adjustable parameters of the working device. Preferably, the optimized parameter sets are tested during development of the autonomous working device, in particular with respect to safe operation, undesired control feedback oscillation loops and performance.

Once the parameters are set in the autonomous working device as described above, the operation of the autonomous working tool in its intended individual working environment will always make use of this set of parameters. Of course, in case that the setting of the parameters must be repeated, for example after moving to another place, the device can be set back to default values and the setting process of parameters starting with the generation of an individual set of sensor values for an individual working environment is repeated.

In order to achieve comparable results it is advantageous if the parameters that are used for generating the sensor values and the parameters for generating the further set of individual sensor values are the same. In order to ensure this a default parameter set can be defined which is preset in the sold autonomous working device and which is also used during development for generating the sets of sensor values for the different working environments.

Although the procedure is described mostly by referring to the use of the actual hardware device and operating it in an actual working environment, it is to be noted that the same results can be achieved by using a software model for the device and a simulator which simulates the working environment and the operation of the device realistically. Of course, also a combination of both can be realized.

The autonomous working device in which the set of parameters shall be set according to certain embodiments of the present invention, includes at least a memory, an actuator, a sensor, a processor for processing sensor values and controlling, based on a set of parameters stored in the memory, the actuators of the working device to perform a specific working task. In the memory a plurality of sets of optimized parameters is stored which are generated during development of the autonomous working device, wherein each set of optimized parameters is associated to one prototypical working environment and includes any adjustable parameter used during operation of the autonomous working device. All parameters which might be adjusted, need to be defined and specified in the optimized set of parameter.

The processor of the autonomous working device is further configured to collect in an individual working environment an individual set of sensor values as mentioned above preferably by using default operation parameters, and to determine based on these individual sensor values the prototypical working environment showing highest similarity with the individual working environment. Then, since to each of the prototypical working environments one set of optimized parameters is associated, a set of optimized parameters can be selected which is suitable for operating the autonomous working device in this individual working environment.

Advantageous aspects are defined in the dependent claims.

As already indicated above, it is in particular preferable that a predetermined set of parameters is used for the generation of sensor values for the different working environments but also during collection or generation of sensor values for the individual working environment. By using the same predetermined parameter set it is ensured that a correct determination of the prototypical working environment with the highest similarity can be achieved.

It is in particular preferred that transformation of information into another representation is performed such a data compression on the generated sensor values by transforming the generated sensor values into a low dimensional representation for each working environment or a histogram. The reduction of the dimension is particularly advantageous, because the association of the correct prototypical environment is performed within the autonomous working device. Since processing capabilities in such autonomous working devices are rather limited, the reduction of the data amount that needs to be processed is a great advantage. Such data compression step can for example make use of a histogram rather than the actually sensed sensor values.

For the partitioning of the generated sensor values of the different working environments it is particularly advantageous if a numerical clustering algorithm is used. Using such numerical clustering algorithm, for example the k-means algorithm, one representative sensor value set can be selected. Such representative set of sensor values may for example be the cluster center. Thus, for a specific category of working environments there is stored one representative sensor value set which is then stored in the device. Using such representative set of values is also helpful to reduce the data amount that needs to be processed in the autonomous working device. The comparison between the prototypical working environments and the individual working environment can then be performed by determining the prototypical working environment represented by the representative set of sensor values and the individual set of sensor values. No complex calculation with all the sensor values for the different working environments has to be performed.

Furthermore, it is desirable that each set of sensor values that is generated consists of a complete time series of sensor values and/or features (e.g. events) derived therefrom during a fixed period of time. It is to be noted that sensor values are also used to derive events that were performed during operation of the autonomous working device. Such events may for example be turning maneuvers, hitting an obstacle, sensing the edge of a working area (border wire in case of an autonomous lawn mower), electro-magnetic field measurements (which determines the proximity to the border wire), acceleration measurements or odometric measurements.

Furthermore, it is advantageous if for the data compression a histogram on events that are derived from the sensor values is generated. Generating such histogram form the sensor data easily allows to associate the individual working environment with one of the prototypical working environments, because the pattern of the respective histograms can be easily compared with each other. A preferred example for a histogram uses the number of times where the autonomous working device is going straight ahead for a certain amount of time without hitting an obstacle.

Similarly a garden layout may be derived from the sensor raw data and then geometric properties describing the working area can be made to reduce the data amount.

Furthermore, it is advantageous to perform the optimization of the set of parameters by using an evolutionary algorithm. With such evolutionary algorithm candidate parameter sets are used to simulate or test the mowing of a number of randomly chosen environments that belong to the same category. From the result of this simulation an inverse mowing efficiency is calculated which is the time that the autonomous working device needs for fulfilling the required task, by 95%. In the example of an autonomous lawn mower the inverse mowing efficiency corresponds to the time $t^b$ needed by the lawn mower to mow 95% of the total garden area $A_b$ at least once, relative to the total garden area, i.e. $t_b/A_b$. The fitness function to be minimized by the optimization is then calculated as the average over the inverse mowing efficiencies for each environment $E_b$, $$f(P_j) = \frac{1}{B}\sum_{b=1}^{B}\frac{t_b(P_j)}{A_b}.$$

Alternatively, the maximum over all mowing efficiencies can be used, $$-\tilde{f}(P_j) = \max\frac{t_b(P_j)}{A_b}.$$

Embodiments of the autonomous working device include autonomous indoor cleaning robot, in particular for home appliance, an agricultural care robot, a harvesting robot or a seeding robot.

BRIEF DESCRIPTION OF THE DRAWINGS

Further advantages and aspects of the present invention will be clear from the following explanation taking into consideration the drawings in which.

Figure 1:
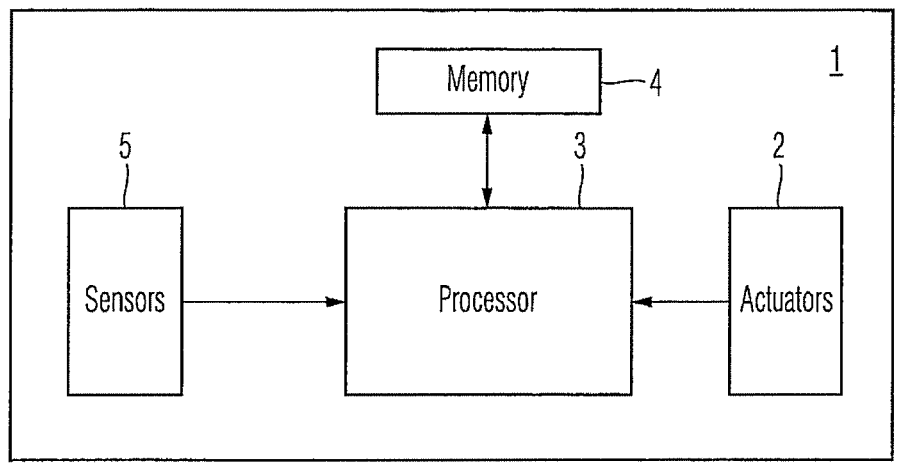
FIG. 1 is an overview over the general structure of an autonomous working device.

DETAILED DESCRIPTION:

In FIG. 1, there is shown a block diagram of one example of an autonomous working device 1. The autonomous working device 1 comprises a plurality of actuators 2 that are controlled by a processor 3. The actuators 2 include for example motors for driving wheels of the autonomous working device, but also driving mechanisms for operating a working tool and the like, such as a blade in case of an autonomous lawn mower.

All the actuators 2 are controlled by a processor 3 on the basis of parameters. By means of these parameters the specific way of operating the autonomous working device 1 is defined. Such parameters may for example define a minimal and a maximal turning angle or probabilities to determine which type of turning maneuver has to be performed in certain situations like approaching a border wire. Values for these parameters are stored in a memory 4, which is connected to processor 3. When the autonomous working device 1 is used for the first time by a customer, the parameters, which are used by processor 3 to control actuators 2, are default parameters, which are set when the autonomous working device is manufactured.

In addition, the processor 3 is connected to a plurality of sensors 5. The plurality of sensors 5 may comprise for example bump sensors to detect collision with an obstacle while driving, sensors for determining proximity to a border wire in case of an autonomous lawn mower or other means that indicate that the edge of the working area is reached, but also cameras. Of course, further sensors may be used. The raw data that are obtained by the sensors 5 are forwarded to the processor 3, which may process the sensor data to determine sensor values including features derived from the raw data and events that are encountered during operation of the autonomous working device 1.

Figure 2:
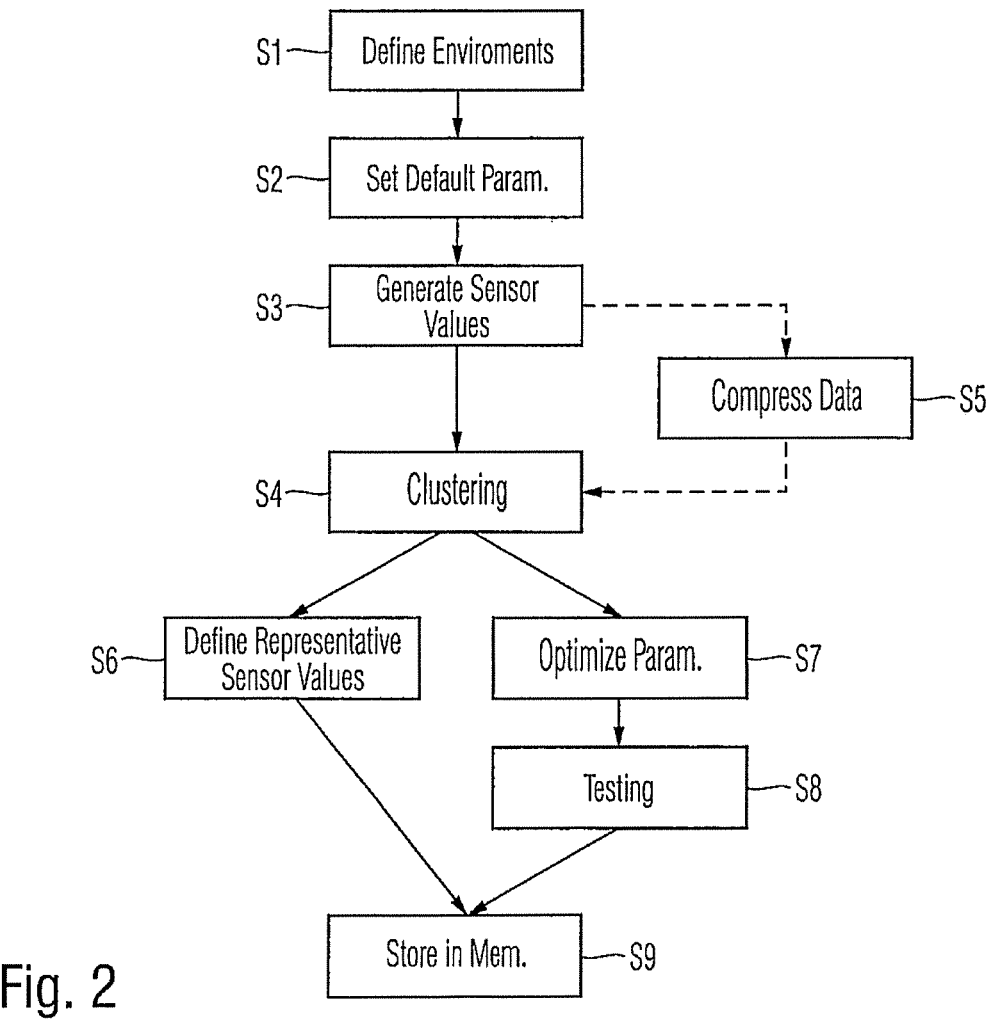
FIG. 2 is a flowchart illustrating the generation of an optimized parameter set.

The functioning of the autonomous working device 1 in the context of the present invention will now be described with respect to flowcharts of FIGS. 2 and 3. In the flowchart of FIG. 2, it is explained how a plurality of parameter sets is generated from which according to the process described with respect to FIG. 3, the autonomous working device 1 selects the most appropriate one.

At first step S1, a plurality of working environments is defined. The working environments are different from each other and ideally cover a wide range of potential working environments for the autonomous working device 1 during later operation.

Thereafter, in step S2 default parameters are set for the autonomous working device 1. The default parameters are chosen such that safe and reliable operation of the autonomous working device 1 can be ensured in any of the working environments defined above.

Thereafter, in step S3 sensor values are generated. The generation of the sensor values may be performed by using a real autonomous working device 1, operating it in each of the plurality of working environments and recording the outputs of the sensors 5. As mentioned above already, the sensor values could also be generated by using a simulation model of the working device 1 with a corresponding simulator. It is to be noted that sensor values may also comprise features that are derived from the raw sensor data. For example, a turning operation when an autonomous lawn mower reaches a boundary wire can be derived from odometry data that uses rotation angle sensing of the driven wheels.

The generation of sensor values is performed for each of the potential working environments so that one corresponding sensor value set is generated for each of the plurality of working environments.

These sets of sensor data are then partitioned into a smaller number of groups. This means that the working environments and their corresponding sensor value sets are grouped together, which means that for example different garden layouts are classified. These classes or categories are significantly smaller in number than the originally defined plurality of potential working environments.

A typical number for categories is for example 10 to 20. Each such category represents a prototypical working environment, i.e. a garden type in the case of an autonomous lawn mower.

The classification on the basis of the sets of sensor values is done automatically in an unsupervised fashion. For example a clustering algorithm like k-means++ can be applied to the raw sensor values directly but also, as mentioned above already, on derived sensor features. Apart from the events that can be derived from the raw sensor data, such sensory features also can be a histogram of free driving path durations (i.e. how many times the mower droves straight without hitting an obstacle for various time durations) or the sensor readings can be used to construct a map of the garden and taking the geometric properties of the garden, for example the number and dimensions of elementary shapes (ellipses, triangles, rectangles) needed for a complete minimum cover of the lawn area.

In order to reduce the amount of data that needs to be processed the generated sensor values may be compressed. One way to compress the sensor date is the already mentioned generation of histogram from the sensor data or extracting basic geometries from a layout map. In general the compression of data means the reduction of the multi-dimensional space in which the sensed values are generated to much fewer dimensions, usually just one dimension.

The clustering algorithm can then be applied on the compressed data.

Once the prototypical working environments are determined a representative set of sensor values for each of these prototypical working environments is defined. When clustering as explained above is used for partitioning the sets of sensor values for example the cluster center for the sensor values may be used to represent a specific category of working environments. On the other side, the working parameters are optimized for each prototypical working environment in step S7. The optimization process uses a numerical optimization approach. Especially suited optimization algorithms are black-box optimizers which do not use explicit gradient information, in particular nature-inspired algorithms, like evolutionary algorithms, partial swarm optimizations or differential evolution. The quality criterion to be maximized is given by the operation efficiency which quantifies the extent to which a task of the autonomous working device is solved. In case of an autonomous lawn mower the mowing efficiency is the quality criterion and quantifies the amount of lawn mowed at least once in a certain amount of time. Alternative or additional quality criteria like the minimization of the area mowed more than once could be incorporated by using multi- or many-objective optimization algorithms with or without incorporation of user preference. Examples are non-dominated sorting genetic algorithm-II or reference vector guided evolutionary algorithm. The result of the optimization process is a set of parameters that should be well-suited for the respective category or prototypical working environment. Before these sets of parameters are finally associated with the prototypical working environment the performance of such optimized parameter set is tested in step S8. This testing with the optimized parameter set is done with respect to safety aspects, efficiency or user acceptance. If one parameter set fails the assessment, an adapted parameter set is generated fulfilling all requirements which can be done by a re-optimization with additional constrains. For each of the categories or prototypical working requirements an optimized parameter set has been successfully tested these parameter sets are stored in the memory 4 of the autonomous working device 1. The optimized parameter sets are stored associated with the representative sensor values and thus associated with the respective prototypical environment. At the end of the first part of the process each of the autonomous working devices 1 that are then sold to the costumers, comprises a memory 4 in which optimized parameter sets for prototypical working environment is stored in association with a representative sensor value set.

Figure 3:
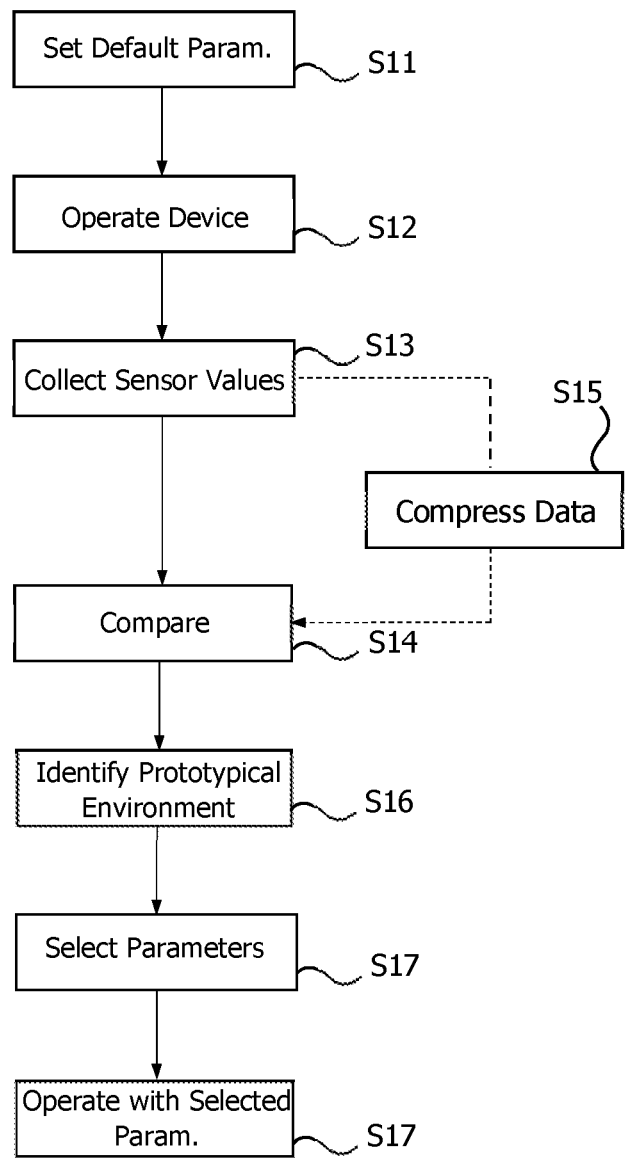
FIG. 3 is a flowchart explaining the selection and setting of one of the optimized parameter sets.

FIG. 3 now shows the process for selecting an individual environment in which the autonomous working device shall be operated. At first (S11) it is ensured that the parameter set that is used for an initial operation of the autonomous working device 1 corresponds to the parameter set which is used in step S2 when the sets of sensor values for the different working environment are generated. Then, in step S12 the device is operated in the individual working environment and in step S13 the sensor values generated during the operation of the autonomous working device 1 are collected as individual sensor values.

On the basis of the collected individual sensor values (including also features derived from the raw sensor data) a comparison with the stored representative data generated in step S6 is performed. As a result of the comparison in step S14 the representative data having the highest similarity with the collected individual sensor values is determined and thus the prototypical working environment that can be assumed to be closest to the individual environment. As it was done on the basis of the generated sensor values of step S3, also during the start-up process and on the basis of the collected sensor values, a corresponding data compression can be performed in step S15. After determining in step S14 the representative sensor values being closest to the collected sensor values, the prototypical environment is identified in step S16. Thereafter in step S17 the optimized parameter set that is associated to the identified prototypical environment is selected and is set and used by the processor 3 for further operation of the autonomous working device 1.

It has to be noted that although the example of FIGS. 2 and 3 refer to the generation of the sets of sensor values by using a real autonomous working device 1, generation of the sensor values may also be achieved by using a model of the autonomous working device 1 and simulating its operation. Further, although processing of the entirety of collected sensor values, it is preferred to compress the data by reducing to a low-dimensional representation such as a histogram. In particular the histogram includes the number of times where a certain behavior of the autonomous working device 1 can be derived from the sensor raw data. In case of an autonomous lawn mower this is for example the time where the lawn mower was going straight ahead without hitting an obstacle between $t_k$ and $t_{k+1}$ seconds. Sensible values for the time intervals are $t_0=0$, $t_1=10$, $t_2=20$, $t_3=30$, $t_4=40$, $t_5=50$, $t_6=60$, $t_7=120$, $t_8=\infty$ seconds. Another way to reduce the dimension when compressing the data is to first construct the garden layout map from the sensor values and then extracting geometric properties of the garden, such as the number and dimensions of elementary shapes. Such elementary shapes may be ellipses, triangles and rectangles. For the comparison with the respective elementary shapes derived from the sensory values collection according to FIG. 3, then only the elementary shapes needed for a complete minimum cover of the lawn area are used.

The invention claimed is:

1. A method for setting parameters in an autonomous working device, the autonomous working device being controlled based on a plurality of working parameters configured for the autonomous working device to perform a working task, the method comprising, in a process of generating working parameters:
  generating for each of a plurality of different working environments a set of sensing values that sensors of the autonomous working device produce while being operated in the respective working environment;
  partitioning the plurality of sets of sensing values into categories using a numerical clustering algorithm, determining for each cluster corresponding to one category, a representative set of sensing values, each category corresponding to one prototypical working environment;
  optimizing the working parameters for each category to find an optimized working parameter set for each prototypical working environment;
  storing the sets of optimized parameters in a memory of the autonomous working device, wherein each optimized working parameter set for each prototypical working environment is stored in association with a respective representative set of sensing values; wherein the method further comprises in the process of generating the working parameters:
  generating for an individual working environment in which operation of the autonomous working device shall be performed an individual set of sensing values that the sensors of the autonomous working device produce while being operated in this individual working environment;
  determining, based at least on the individual set of sensing values, among the prototypical working environments stored in the memory, the prototypical working environment showing highest similarity to the individual working environment;
  setting the working parameters in the autonomous working device according to the optimized parameter set stored in the memory corresponding to the determined prototypical working environment; and
  performing, by the autonomous working device, the working task based on the optimized parameter set.

2. The method according to claim 1, wherein
generation of sensing values for the different working environments and the individual working environment is performed using a same predetermined set of working parameters.

3. The method according to claim 1, wherein
a data compression is executed on the generated sensing values by transforming the generated sensing values into a low-dimensional representation for each working environment.

4. The method according to claim 1, wherein
for determining the prototypical working environment with the highest similarity, a comparison of the individual set of sensing values and the representative set of sensing values is done.

5. The method according to claim 1, wherein
each set of sensing values consists of a complete time series of sensing values or features derived therefrom during a fixed period of time.

6. The method according to claim 5, wherein
a data compression is executed on the generated sensing values by transforming the generated sensing values into a low-dimensional representation for each working environment, and wherein
a histogram on events that are derived from the sensing values is generated.

7. The method according to claim 1, wherein
the optimization is done with a nature inspired black-box optimization algorithm, in particular an evolutionary strategy algorithm.

8. The method according to claim 1, wherein
the autonomous working device is an autonomous lawn mower.

9. The method according to claim 1, wherein
the autonomous working device is an autonomous indoor cleaning robot.

10. The method according to claim 1, wherein
the autonomous working device is an autonomous agricultural care robot or a harvesting robot or a seeding robot.

* * * * *